United States Patent
Vidal et al.

(10) Patent No.: US 8,429,256 B2
(45) Date of Patent: *Apr. 23, 2013

(54) SYSTEMS AND METHODS FOR GENERATING CACHED REPRESENTATIONS OF HOST PACKAGE INVENTORIES IN REMOTE PACKAGE REPOSITORIES

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 354 days.

This patent is subject to a terminal disclaimer.

(21) Appl. No.: 12/790,699

(22) Filed: May 28, 2010

(65) Prior Publication Data

US 2011/0296397 A1 Dec. 1, 2011

(51) Int. Cl.
*G06F 15/177* (2006.01)
(52) U.S. Cl.
USPC ............ 709/221; 709/202; 709/203; 709/224
(58) Field of Classification Search .................. 709/202, 709/203, 221, 224
See application file for complete search history.

(56) References Cited

U.S. PATENT DOCUMENTS

| | | | |
|---|---|---|---|
| 6,438,749 B1 | 8/2002 | Chamberlain | |
| 6,578,113 B2* | 6/2003 | Krishnamurthy et al. | .... 711/141 |
| 7,240,336 B1 | 7/2007 | Baker | |
| 7,472,353 B1* | 12/2008 | Wolff et al. | .................. 715/764 |
| 7,512,939 B2 | 3/2009 | Brookner | |
| 7,624,393 B2 | 11/2009 | Egan et al. | |
| 7,657,885 B2 | 2/2010 | Anderson | |
| 7,693,962 B2* | 4/2010 | Serlet et al. | .................. 709/219 |
| 7,836,341 B1 | 11/2010 | Krishnan | |
| 7,987,449 B1* | 7/2011 | Marolia et al. | ................. 717/120 |
| 2002/0156839 A1* | 10/2002 | Peterson et al. | ............. 709/203 |
| 2003/0051235 A1 | 3/2003 | Simpson | |
| 2003/0079041 A1* | 4/2003 | Parrella et al. | ................ 709/247 |
| 2003/0229890 A1 | 12/2003 | Lau et al. | |
| 2005/0076087 A1* | 4/2005 | Budd et al. | .................... 709/206 |
| 2005/0210459 A1 | 9/2005 | Henderson et al. | |
| 2006/0107062 A1* | 5/2006 | Fauthoux | ...................... 713/182 |
| 2006/0190773 A1 | 8/2006 | Rao et al. | |
| 2006/0230398 A1 | 10/2006 | Yokota | |

(Continued)

OTHER PUBLICATIONS

Seth Kelby Vidal, "System and Methods for Initiating Software Repairs in Conjuction With Software Package Updates", U.S. Appl. No. 12/714,200, filed Feb. 26, 2010.

(Continued)

*Primary Examiner* — Liangche A Wang
(74) *Attorney, Agent, or Firm* — Lowenstein Sandler LLP (57) ABSTRACT

Embodiments relate to systems and methods for generating cached representations of host package inventories in remote package repositories. A physical or virtual client machine can host a set of installed software packages, including operating system, application, and/or other software. A package manager installed on the client reports an inventory of the installed packages to one or more package servers. The package server(s) can receive the inventory from machines populating the managed network, and generate an encoded identification for each constituent package, such as a hash-based output based on package attributes. The encoded identification and other data can be stored to an aggregate package cache in the one or more package servers, for more efficient management of the host machines in the managed network. In embodiments, the package update files for each identifier can also be stored in the cache for even more efficient inventorying and package update operations.

20 Claims, 5 Drawing Sheets

U.S. PATENT DOCUMENTS

| | | | |
|---|---|---|---|
| 2007/0038991 | A1 | 2/2007 | Schuft et al. |
| 2007/0157192 | A1 | 7/2007 | Hoefler et al. |
| 2007/0169075 | A1 | 7/2007 | Lill et al. |
| 2008/0134165 | A1 | 6/2008 | Anderson et al. |
| 2008/0141240 | A1 | 6/2008 | Uthe |
| 2008/0201705 | A1 | 8/2008 | Wookey |
| 2008/0262878 | A1* | 10/2008 | Webby et al. .................... 705/5 |
| 2009/0013319 | A1 | 1/2009 | Williams et al. |
| 2009/0037897 | A1 | 2/2009 | Dull et al. |
| 2009/0300595 | A1 | 12/2009 | Moran et al. |
| 2010/0023933 | A1 | 1/2010 | Bryant et al. |
| 2010/0058308 | A1 | 3/2010 | Demshur et al. |
| 2010/0058314 | A1 | 3/2010 | Wang |
| 2010/0083243 | A1 | 4/2010 | Mincarelli et al. |
| 2010/0100636 | A1* | 4/2010 | Hegde et al. ................. 709/231 |
| 2011/0296394 | A1* | 12/2011 | Vidal et al. .................... 717/171 |

OTHER PUBLICATIONS

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, flied May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

152 PACKAGE CACHE ASSOCIATION TABLE

AGGREGATE PACKAGE CACHE 166

| ENCODED ID OF PACKAGE | PACKAGE NAME | PACKAGE VERSION | PACKAGE SIZE | PACKAGE STORAGE LOCATION | PRECEDING VERSION | OPERATING SYSTEM | MACHINE GROUP HOSTING PACKAGE | OTHER PACKAGE ATTRIBUTES |
|---|---|---|---|---|---|---|---|---|
| ES463ZH | MESSAGING 2 | 4.3 | 32.1 MB | L:REPO/PKG2 | 4.2 | LINUX | GROUP 10 | ... |
| FTB1868F | DATABASE 1 | 6.0 | 66.8 MB | L:REPO/PKG6 | 5.7 | LINUX | - | |
| B11D23T | FIREWALL 4 | 9.1 | 52.2 MB | PACKAGE CACHE ENTRY ID | 9.0 | LINUX | GROUP 4 | |
| | | | | | | | ... | |
| L461FM33 | BROWSER 3 | 5.0 | 11.0 MB | PACKAGE CACHE ENTRY 2 | | LINUX | GROUP 1; GROUP 3 | |

164

150

| CACHE ENTRY | PACKAGE UPDATE FILE | PACKAGE SIZE | ENCODING/ COMPRESSION |
|---|---|---|---|
| ENTRY 1 | MESSAGING 1 | 2.2 MB | ZIP |
| ENTRY 2 | BROWSER 3 | 11.0 MB | ZIP |
| ENTRY 3 | FIREWALL 2 | 10.3 MB | NONE |
| ... | | | |
| ENTRY X | PACKAGE NAME Z | SIZE 4 | ZIP |

156 SET OF CACHED PACKAGE UPDATES

SYSTEMS AND METHODS FOR GENERATING CACHED REPRESENTATIONS OF HOST PACKAGE INVENTORIES IN REMOTE PACKAGE REPOSITORIES

FIELD

The present teachings relate to systems and methods for generating cached representations of host package inventories in remote package repositories, and more particularly, to platforms and techniques for capturing the package inventories of host machines in a managed network, generating an encoded identifier for each package and storing those cumulative identifiers in a server-side cache, to facilitate further package update or other activity.

BACKGROUND OF RELATED ART

Users of physical or virtual machines commonly install software packages, including package updates, to those machines. The software packages can contain a set of related files chosen to perform a given application or task, such as, for example, a group of software applications, drivers, and/or other resources used to install and use messaging or media applications. In instances, a software package can contain application software, operating system software, drivers, patches, and/or other software components grouped as a logical set.

Software package managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories and associated package servers, to directly connect to those databases and download available package updates.

The process of managing package installations and initiating software package updates can involve, however, a significant degree of processing overhead, including when the managed network in which the host or client machines are installed is large. In those and other cases, tracking the package server may have to capture, store, register and manage a large database containing the identifiers of all the packages installed on each host machine in the managed network, as well as the attributes of that package, the host machine ID, and then register that information with the actual package update files stored in one or more associated package repositories. Processing that data, for instance to generate a collective package update for all machines on the network, can therefore involve a significant amount of processing overhead, including input/output overhead as package update files are identified, retrieved, and served to the host machines which are scheduled for a package update. In those large-scale and other network architectures, it would be advantageous to be able to consult a local or high-speed storage record of the package complements installed on machines in the managed network, without a need to communicate with those machines directly. It would likewise be advantageous to generate a compact representation of the cumulative set of installed packages on the machines in the network, and, optionally, to be able to store some or all of the associated package update files in a high-speed or local cache attached to the package server itself, so that package update files can be served without a need to access remote and/or lower-speed storage, and serve package updates to the host machines more efficiently. It may accordingly be desirable to provide systems and methods for generating cached representations of host package inventories in remote package repositories, in which a package server or other management platform can generate and manage encoded identifications of package installations from host machines in a managed network, and store those encoded identifiers, potentially with the corresponding package update files themselves, to a local cache memory for use in package updating, inventorying, and/or other activities.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating cached representations of host package inventories in remote package repositories. More particularly, embodiments relate to platforms and techniques for configuring and deploying one or more package servers which can receive an inventory of a set of installed packages from the set of client or host machines, in a managed network. Each host or client machine can have a set of one or more installed packages installed, hosted, and/or operating locally on that machine. Each of those host machines can, in aspects, transmit an inventory of its set of installed packages to the one or more package servers. In aspects, the inventory can be encapsulated on an encoded or unencoded basis by each host for transmission to the one or more package servers. The one or more package servers and/or other platforms or logic, can receive and aggregate the inventory of the set of installed packages from to host machines populating the managed network, and collect and store that information in an aggregate package cache. The aggregate package cache can be or include high-speed local memory or storage attached to the one or more package servers. The one or more package servers can build, within the aggregate package cache, a set of encoded identifiers for each package file in the cumulative set of packages installed in the managed network. The encoded identification can be or include a hashed representation of the set of installed packages on a given target or client, based on the package names, file names, installation dates and times, sizes, and/or other attributes of the set of installed packages. The encoded identification can be associated with the corresponding package file or package update file in the aggregate package cache. In aspects, the one or more package servers can thereby build a cached, and/or encoded, representation of all the package complements of all host machines operating in the managed network, facilitating efficient communications, sorting, and accessing of those package files, for instance for performing single or collective updates to the host machines. In addition, in embodiments, the one or more package servers can also store some or all of the available package update files themselves in the aggregate package cache, further enhancing package file retrieval, transmission, and host updating operations. These and other embodiments described herein address the various noted shortcomings in known package update technology, and provide a user with enhanced package and system management capability for inventorying, encoding, caching, tracking, updating, and managing the software package resources in a managed network with more storage and processing efficiency, including less need for exchanges across the network to inventory and update client package sets, as well as to perform additional management and configuration functions with enhanced capabilities.

Reference will now be made in detail to exemplary embodiments of the present teachings, which are illustrated in the accompanying drawings. Where possible the same reference numbers will be used throughout the drawings to refer to the same or like parts.

Figure 1:
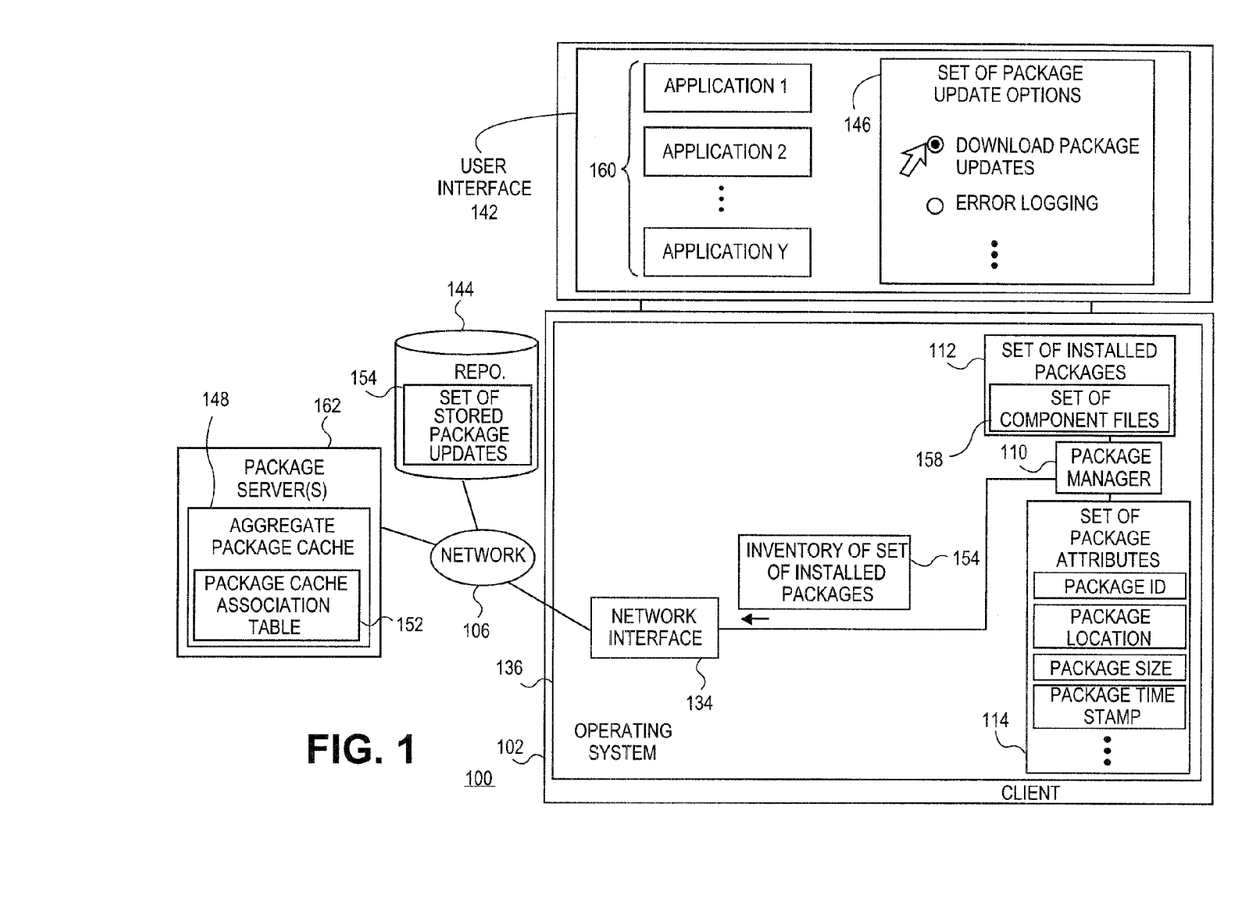
FIG. 1 illustrates an overall network in which systems and methods for generating cached representations of host package inventories in remote package repositories can be implemented, according to various embodiments.

FIG. 1 illustrates an exemplary managed network 100 in which systems and methods for generating cached representations of host package inventories in remote package repositories, according to various embodiments. In embodiments as shown, in the managed network 100 a set of one or more clients 102 can store, execute, and otherwise host a variety of resources including a package manager 110 configured to communicate with a set of installed packages 112, and other hardware, software, and resources. In embodiments, the package manager 110 can be or include a software application, a utility, an application programming interface (API) to an operating system 136 of the one or more clients 102, a service, and/or other local or remote logic or resources. According to embodiments, the package manager 110 can access and manage the set of installed packages 112 to run, edit, update, inventory, configure, and otherwise manage the one or more software packages 112 hosted or installed in the one or more clients 102. In aspects, the package manager 110 can be or include one or more commercially and/or publicly available package manager applications or resources, such as the "yum" package manager available from Red Hat, Inc., Raleigh, N.C., based on or compatible with the Red Hat package manager (rpm) platform also available from Red Hat, Inc., or others.

In aspects, each package in the set of installed packages 112 can include a set of component files 158, such as executable files and/or other files or resources. In aspects, the set of component files 158 of the set of installed packages 112 can contain executable files for, or otherwise support or be associated with, a set of applications 160 installed on the one or more clients 102. In aspects, the set of applications 160 can be or include types of applications or other software, such as, for example, messaging applications, database applications, media applications, spreadsheet or modeling applications, social networking applications, word processing applications, and/or other applications or utilities, and can in aspects include an operating system, drivers, and/or components thereof. The set of installed packages 112, and/or the set of component files 158 of those packages, can have an associated set of package attributes 114 which reflects or records the file names, versions, dates, storage sizes, software requirements, an/or other attributes related to the software packages including their updates installed on the one or more clients 102 and/or other hosts, and reflected in the set of installed software packages 112.

In aspects, the package manager 110 can communicate with a network interface 134 configured to connect to one or more networks 106, such as the public Internet or other public or private networks. The package manager 110 can thereby connect to one or more package servers 162 and associated one or more package repositories 144 hosting a set of software packages, including application package updates, operating system installations and/or updates, and/or other software related to packages and their associated resources.

In aspects, the one or more package servers 162 can interact with the one or more clients 102 and/or other host machines to interrogate, inspect, inventory, encode, configure, test, update, and/or otherwise manage the set of installed packages 112 operating on the one or more clients 102 throughout the managed network 10. The package manager 110 can, for example, provide a user with a set of package update options 146 displayed via a user interface 142, such as a graphical user interface or others, to select various test, configuration, and/or other management activities on the set of installed packages 112. The set of package update options 146 presented to the user of the one or more clients 102 can include options such as one or more selections to select packages for inventorying, installation and/or update, installation options, and/or other options or parameters for the downloading of package updates from the one or more package servers 162 and their associated one or more package repositories 144 to the local set of installed packages 112. Each of the one or more package repositories 144 can store or host a set of stored package updates 154, such as an aggregate file storing a set of files, utilities, operating system or components therefore, and/or other software needed to effect a package update on the one or more clients 102 and/or other clients, targets, hosts, or machines, including virtual machines.

The package manager 110 of some or all of the one or more clients 102 in the managed network 100 can be configured to capture an inventory of the set of installed packages 154 by inspecting the set of installed packages 112, the set of package attributes 144, and/or other local data or resources related to each subject client of the one or more clients 102. In aspects, the inventory of the set of installed packages 154 can include, incorporate, and/or reference the set of package attributes 114, as well as the package names, package file names, or other package IDs of the set of installed packages 112. Once locally captured and generated, the package manager 110 can transmit the inventory of the set of installed packages 154 to the one or more package servers 162 via the one or more networks 106. In aspects, the inventory of the set of installed packages 154 can receive the inventory of the set of installed packages 154 and any associated data, and use that information to build and manage an aggregate package cache 148 located in or associated with the one or more package servers 162. In aspects, the aggregate package cache 148 can comprise or contain a package cache association table 152 that can store package IDs, encoded identifiers of those packages or their ID, the set of attributes 114 for each of the inventory of the set of installed packages 154 reflected in the aggregate package cache 148, information regarding the one or more clients 102 whose package complements are stored in aggregate package cache 148, and/or other locally cached data. According to aspects, the storage of the package cache association table 152 and information therein related to the identities, versions, storage locations, and other parameters related to package updates for the one or more clients 102 can permit the one or more package servers 162 to access, sort, analyze, configure, and initiate package update operations on the one or more clients 102 with reduced communications and processing overhead, since some or all information necessary to prepare and generate a package update, on a single or collective basis, can be accessed by the one or more package servers 162 locally from high-speed memory or storage.

Figure 2:
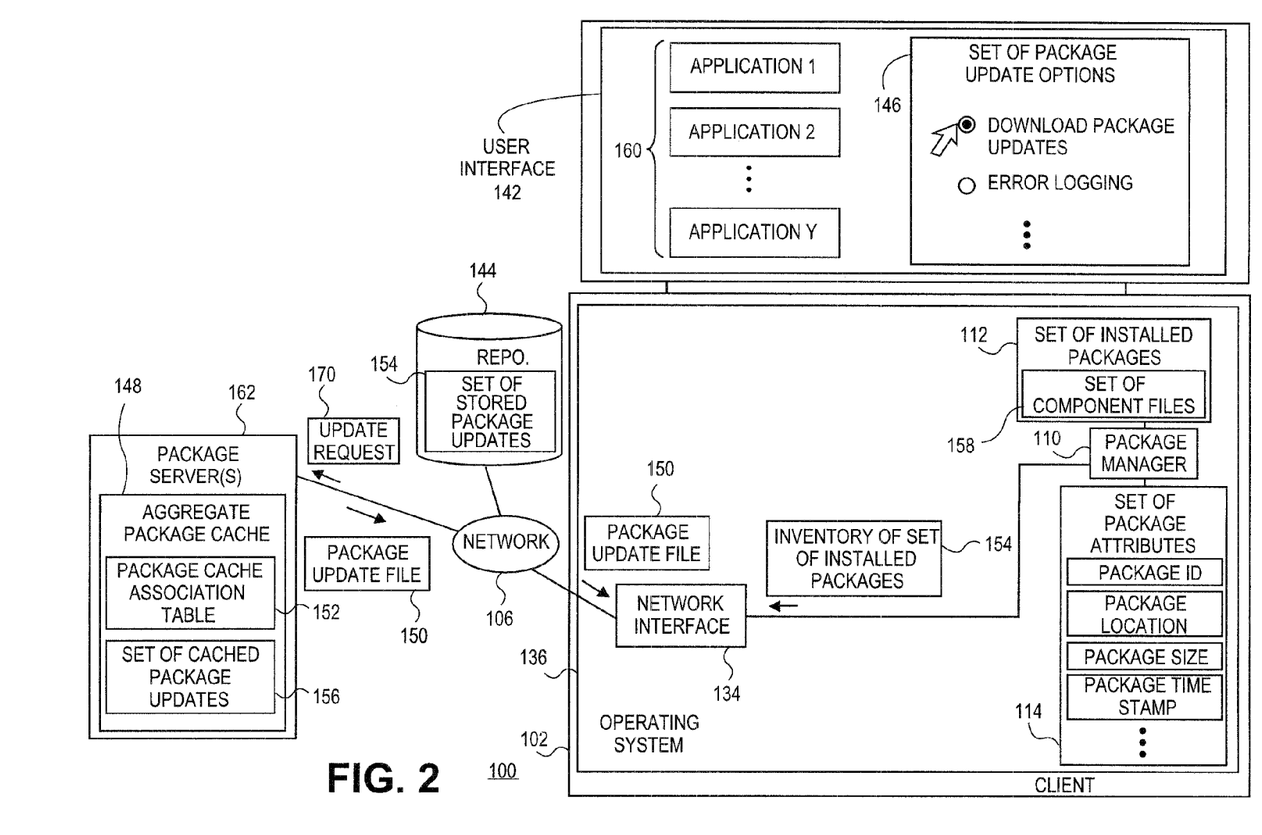
FIG. 2 illustrates an overall network in which for systems and methods for generating cached representations of host package inventories in remote package repositories can be implemented, according to various embodiments in further regards.

In aspects, and as illustrated for example more particularly in FIG. 2, the one or more package servers 162 can receive the inventory of the set of installed packages 154 from each of the one or more clients 102 in the managed network 100, and process and store that information and related data to take advantage of the relatively high-speed memory or storage resources of the aggregate package cache 148. In aspects, the aggregate package cache 148 can again be or include high-speed electronic memory, such as random access memory (RAM) or static random access memory (SRAM), and/or other memory, storage or media. In aspects, the aggregate package cache 148 can be installed or hosted in the one or more package servers 162, themselves, for instance, via a system bus connected to a processor in the one or more package servers 162. The one or more package servers 162 can place the inventory of the set of installed packages 154 and/or constituent data from that inventory received from each of the one or more clients 102 in the aggregate package cache 148, in a structured format such as the package cache association table 152. In aspects as shown, the package cache association table 152 can be organized as a flat or relational database, although in aspects, other data structures, formats, and/or objects can be used.

In aspects, the one or more package servers 162 can receive a package update request 170 from the one or more clients 102, and process that request to generate the initiation of a package update operation on that request client or other host. In aspects, the package update request 170 can identify a package in the set of installed packages 112 that the user wishes to update. In aspects, one or more package servers 162 can determine an encoded identifier 166 for that package, such as a hashed value of the package name or ID, and use the encoded identifier to locate, search, and analyze the required update resources based on information in the aggregate package cache 148. For instance, the one or more package servers 162 can locate the necessary next package version for performing the requested package update, and can access attributes of the package update, such as compatibility or storage information to prepare the requested package update. In aspects, the one or more package servers 162 can also inspect the package cache association table 152 to determine whether the corresponding package update file 150 required for the pending update request is stored in the set of cached package updates 156 in the aggregate package cache 148, based on the encoded identifier 166 or other key or field. In cases where the package update file 150 is locally stored in the set of cached package updates 156, the one or more package servers 162 can retrieve and serve or transmit that file and/or other data to the requesting one or more clients 102, directly, thus increasing the speed and efficiency with which the package update file 150 can be delivered and the package update process performed. In aspects, when the package update file 150 is not stored in the set of cached package updates 156 of the aggregate package cache 148, but instead is stored in the set of stored package updates 154 of the one or more repositories 144, the one or more package servers 162 can retrieve the package update file 150 from that location or others, and transmit the package update file 150 to the requesting one or more clients 102. In aspects, the transmission of the package update file 150 can be made to multiple clients in the one or more clients 102, on a group or broadcast basis. Both the searching, management, and organizing of package update operations can be enhanced, as well as the delivery of the package update file 150 to the one or more clients 102, and/or other machines of the managed network 100.

Figure 3:
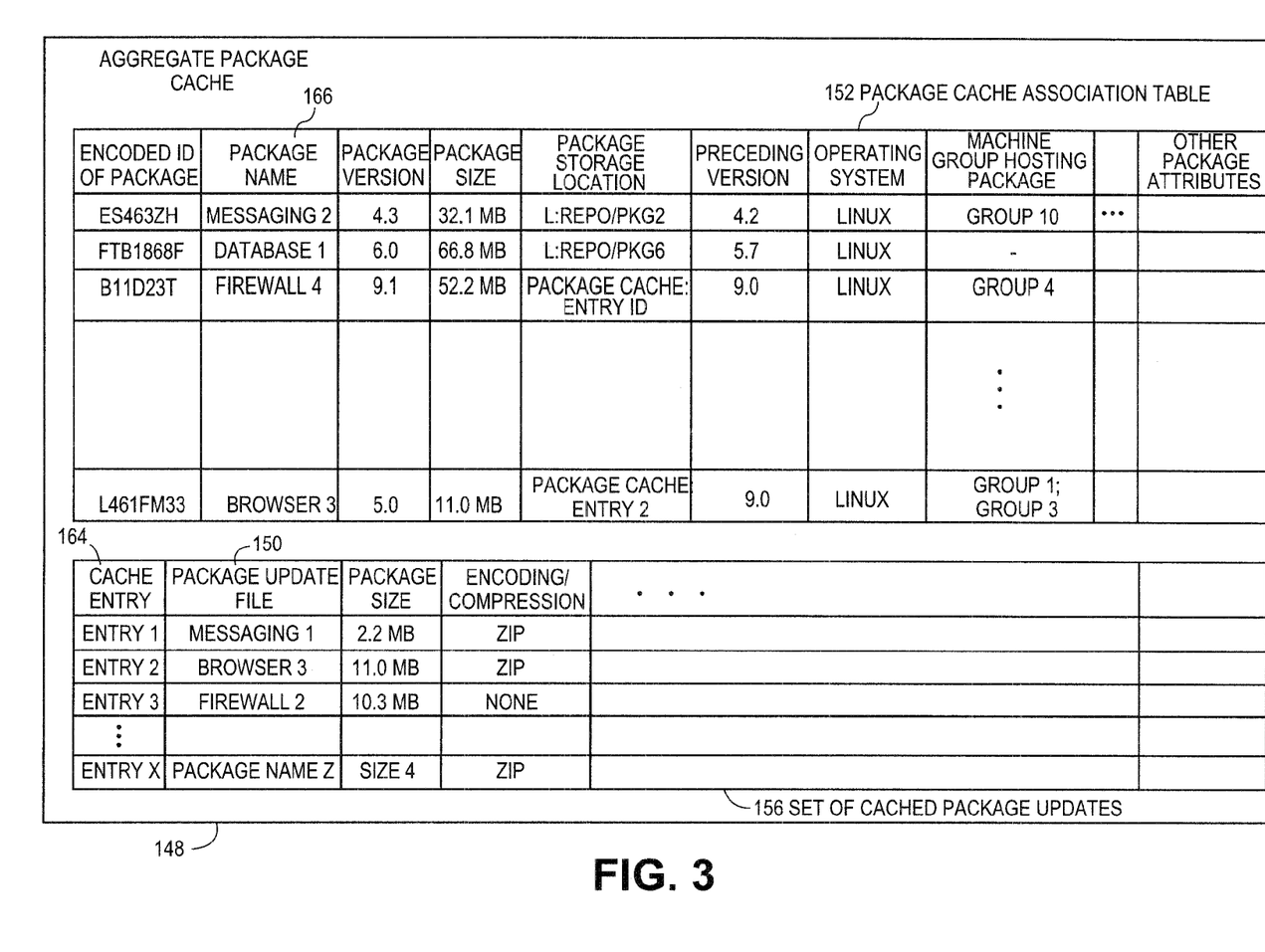
FIG. 3 illustrates an exemplary data structure for an aggregate package cache and constituent data that can be used to store data related to package installations on package servers, according to various embodiments.

FIG. 3 illustrates an exemplary data storage structure for a package cache association table 152 that can be stored in an inventory of the set of installed packages 154 associated with the one or more package servers 162, for network-wide package management, identification, inventorying, updating, and control in managed network 100. In aspects, the package cache association table 152 can contain information related to the inventory of the set of installed packages 154 of each of the one or more clients 102 populating the managed network 100, aggregated into a unified or combined record. The package cache association table 152 can for instance be stored in the aggregate package cache 148 such as electronic memory accessed, stored in, and/or hosted by the one or more package servers 162, themselves. When implemented as electronic memory, the aggregate package cache 148 can be or include relatively high-speed random access memory (RAM), and/or static random access memory (SRAM). In aspects, the aggregate package cache 148 can also or instead be or include other electronic memory, and/or other memory having relatively fast access times and/or low latencies, and available to the one or more package servers 162.

In aspects as shown, the package cache association table 152 can encode and store information that can be keyed on a field identifying the encoded identifier 166 of the packages identified in the inventory of the set of installed packages 154 received by the one or more package servers 162 from each of the one or more clients 102 of the managed network 100. In aspects as shown, the encoded identifier 166 can reflect an encoded representation, such as an alphanumeric string or other output, generated by a hash function applied to the set of attributes 114 of each stored package. The package cache association table 152 can likewise store attributes including the package name, such as a file name, or other ID for the constituent or underlying package file and/or package update file (which herein may together be referred to as a "package update file"). The package cache association table 152 can store other fields or attributes, such as the package versions, the package size, the package storage location 170 indicating the source, address, or location of the package file itself, the preceding version or versions of the package, and the underlying, compatible, or required operating system for that package. The package cache association table 152 can also include, for each package, and as shown, record an identification of the machine group or group(s) of the one or more clients 102 in the managed network 100 which hosts or has installed the subject package. The package cache association table 152 can likewise store additional attributes or data associated with each of the inventory of the set of installed packages 154 for each of the one or more clients 102 in the managed network, including, merely illustratively, dependencies required for installation of those packages, the vendor of those packages, and/or other fields or data.

As also shown, in addition to the package cache association table 152, in embodiments the aggregate package cache 148 can also store a set of cached package updates 156, incorporating the actual package update file 150 for one or more cached package updates 156. The type or number of the set of cached package updates 156 can depend, for instance, on the amount of available memory in the aggregate package cache 148 available to the one or more package servers 162. In aspects, in cases where the one or more clients 102 requests the updating of a package whose encoded identifier 166 appears in the package cache association table 152, the package storage location 170 of that package is reflected to be located in the set of cached package updates 156, the one or more package servers 162 can proceed to retrieve and serve the package update file 150 directly from the set of cached package updates 156. In aspects, the set of cached package updates 156 can record the package update files stored therein based on a cache entry value 164, from which the package update file 150 can be extracted, decoded or encoded as necessary, and transmitted to the requesting one or more clients 102. Other data, fields, identifiers, attributes, commands, and/or other information can be included in the aggregate package cache 148, the package cache association table 152, and/or the set of cached package updates 156.

Figure 4:
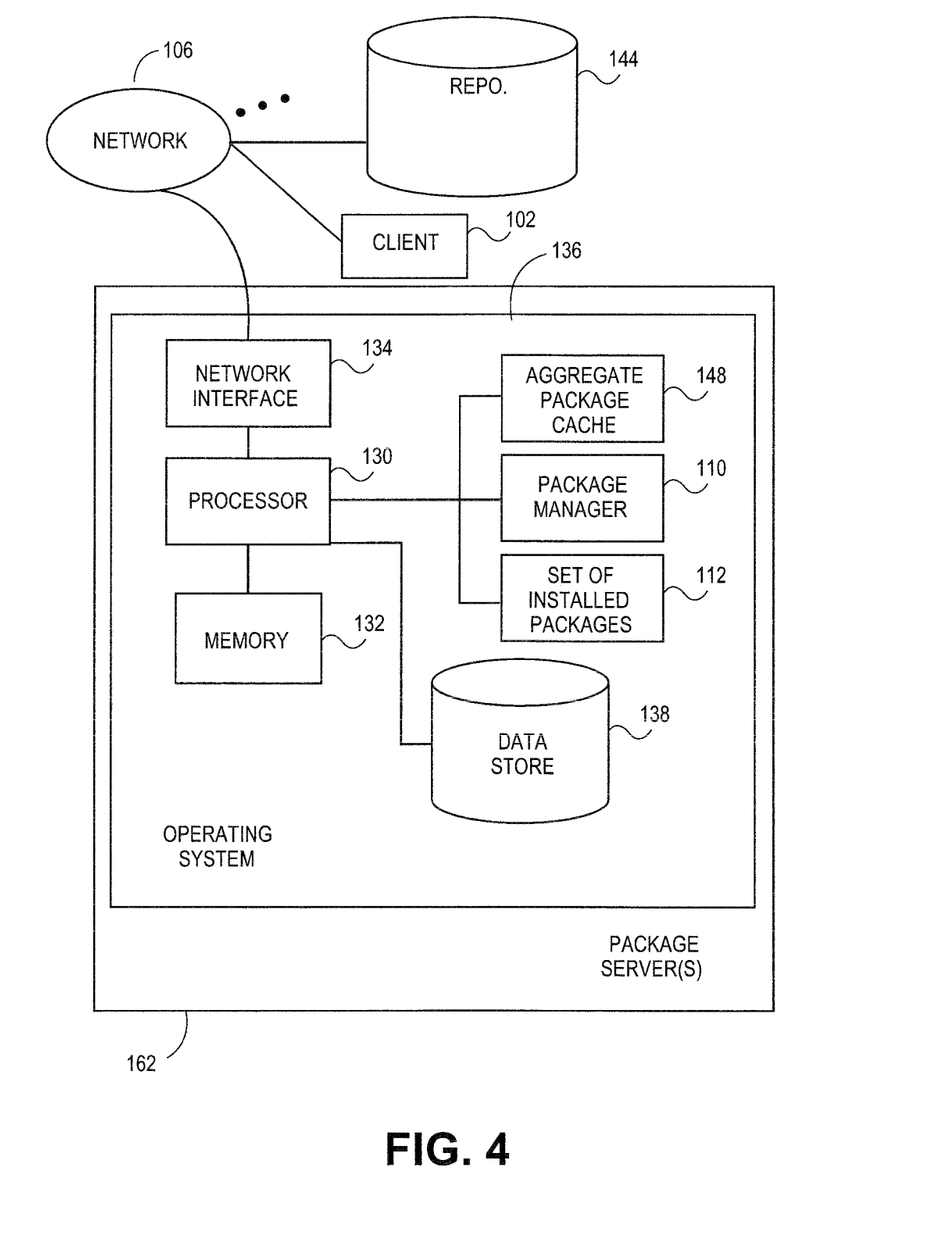
FIG. 4 illustrates exemplary hardware and other resources of a client machine that can be used in systems and methods for generating cached representations of host package inventories in remote package repositories, according to various embodiments.

FIG. 4 illustrates an exemplary diagram of hardware and other resources that can be incorporated in any one of the one or more package servers 162 to manage, encode, cache, and configure information related to the set of installed packages 112 and other resources the on one or more clients 102, according to embodiments. In embodiments as shown, each of the one or more package servers 162 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. The processor 130 communicates with the aggregate package cache 148, which can be or include local high-speed electronic memory, such as static random access memory (SRAM), and/or other memory or storage. The processor 130 also communicates with a management module 128 which can comprise applications, software, and/or logic to perform package management activity, as well as data store 138, such as a database stored on a local hard drive. The processor 130 further can communicate with a network interface 134, such as an Ethernet or wireless data connection, which in turn communicates with one or more networks 106, such as the Internet or other public or private networks. The processor 130 also communicates with one or more clients 102 via the network interface 134 and the one or more networks 106, including the package manager 110 hosted on each machine of one or more clients 102, and with the one or more repositories 144 hosting or storing package updates for the one or more clients 102. The processor 130 of each of the one or more package servers 162 can also communicate with other resources to execute control logic and control the inventorying, encoding, caching, updating, installation, and management of software packages and updates to those packages on those machines and their associated processes. Other configurations of the one or more packager servers 162, including processor and memory resources, associated network connections, and other hardware and software resources are possible. It may be noted that in embodiments, each of one or more clients 102 can contain the same or similar hardware, software, communications, and/or other resources as the one or more package servers 162, or can contain or comprise different hardware and software configurations.

Figure 5:
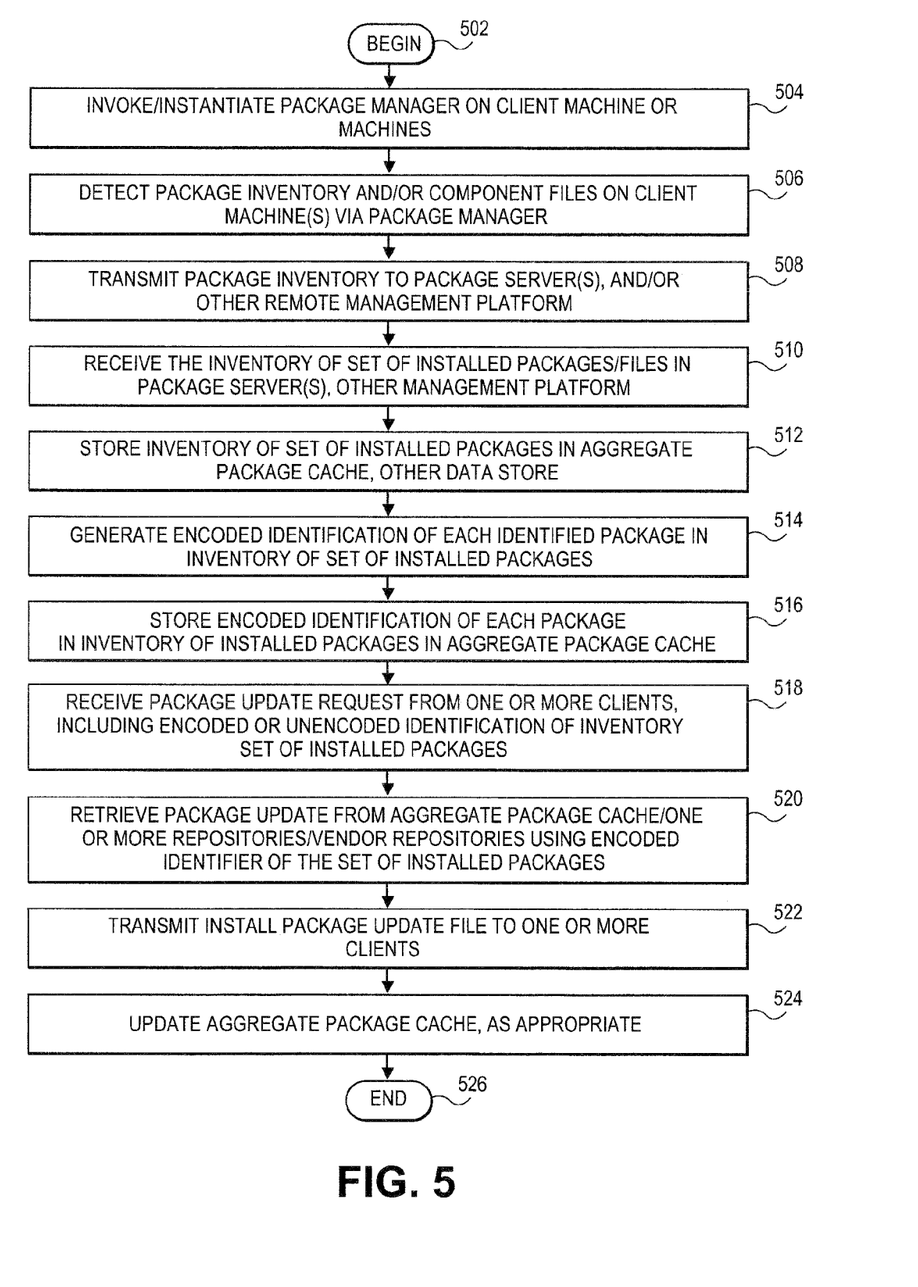
FIG. 5 illustrates a flowchart of processing for package inventorying, analysis, encoding, and caching storing of package identifiers, package update files, and other data that can be used in systems and methods for generating cached representations of host package inventories in remote package repositories, according to various embodiments.

FIG. 5 illustrates overall processing to track, monitor, and manage software packages, component files of those packages, and perform other management activity including to generate an aggregate package cache of package identification data and other information, according to various embodiments. In 502, processing can begin. In 504, a user can invoke or instantiate the package manager 110 on one or more clients 102 to perform inventorying, maintenance, updating, and other activity. In 506, the package manager 110 can detect the package inventory of the set of installed packages 112 and/or inventory of the set of component files 158 of that package complement, to generate the inventory of the set of installed packages 154 for the one or more clients 102. In aspects, the set of component files 158 and/or attributes of those files can be incorporated in the inventory of the set of installed packages 158. In embodiments, the inventorying of the set of installed packages 112 can be conducted by each of the one or more clients 102 in the managed network 100. In aspects, the inventory and related processing can be initiated by a user of the one or more clients 102 via the package manager 110 and/or other logic. In aspects, the inventory and related processing can be initiated automatically by an application or service, for instance, by a management service communicating with the one or more clients 102 to perform an inventory of the total package/file complements on those machines on a periodic, event-triggered, and/or other basis. In aspects, automatic inventories or census checks can be run on the set of installed software packages 112, the set of component files 158, and/or other data or objects of the one or more clients 102 in connection with package update activities, or can be performed independently of package update activities.

In 508, the package manager 110 of the one or more clients 102 can transmit the inventory of the set of installed packages 154 to the one or more package servers 162, and/or other remote management platform. In aspects, the inventory of the set of installed packages 154 can incorporate the set of package attributes 114, and/or other data in addition to the package name of ID, package file name, and/or file name(s) of the set of component files 158 of each package. In embodiments, it may be noted that any one or more of the one or more clients can transmit the inventory of the set of installed packages 154, in an encoded format, such as the same format used by the one or more servers 162 to generate the encoded identifier 166 stored on the server-side to the aggregate package cache 148. In 510, the one or more package servers 162 and/or other remote management platforms, such as network management platforms, (such as, for instance, the fedora unified network controller (func) available from Red Hat, Inc.) can receive the inventory of the set of installed packages 154 from the one or more clients 102.

In 512, the one or more package servers 162 can store the inventory of the set of installed packages 154 to the aggregate package cache 148, and/or other local or remote storage. In 514, the one or more package servers 162 can generate the encoded identification 166 of each package in the inventory of the set of installed packages 154 for all of the one or more clients 102 in the managed network. In aspects, the encoded identifier 166 of each package object can comprise an output or object generated using a hash function operating on text, strings, or other data reflecting one or more attributes in the set of package attributes 114. In cases where a hash function or hash operator is used, the hash function can be or include SHA1 (Secure Hash Algorithm 1), SHA2 (Secure Hash Algorithm 2), SHA3 (Secure Hash Algorithm 3), and/or other hash functions, operators or routines. In aspects, the encoded identifier 166 need not be based on a hash function, but can in addition or instead be based on other classes of functions or algorithms. In 516, the one or more package servers 162 can stored the encoded identifier 166 to the package cache association table 152 in the aggregate package cache 148. In embodiments, some or all of the packages identifiers stored in the package cache association table 152 can also or instead be stored in an unencoded format.

In 518, a package update request can be received from any one or more of the one or more clients 102 in the managed network 100. In aspects, the package update request received from the one or more clients 102 can specify or identify the requested package in unencoded format, or, in embodiments, can encode the requested package ID in a format, such as hashed or other encoded format compatible with the encoding used by the one or more package servers 162 to generate the encoded identifier 166 on the server side. In 520, the one or more package servers 162 can retrieve the requested package update from the set of cached package updates 156 stored in the aggregate package cache 148, if indicated to be located in the set of cached package updates 156 in the package cache association table 152. If not present in the set of cached package updates 156, the requested package update can be retrieved from the one or more repositories 144, or, if not present in the one or more repositories 144, can be retrieved from the repositories or data stores of software vendors operating in the managed network 100. In aspects, retrieval processing performed based on data in the aggregate package cache 148 can include the retrieval of the identification of the necessary package update and the attributes of that update, as well as performing pre-update processing such as compatibility tests or other verifications. In aspects, retrieval processing using data in the aggregate package cache 148 can also as noted include retrieval of the actual package update file 150 corresponding to the update request 170, in cases where the subject package update file 150 has been stored to the set of cached package updates 156 stored in the aggregate package cache 148.

In 522, the one or more package servers 162 can transmit the package update file 150 to the one or more clients 102 transmitting the update request 170 for a package update file 150, which client or host can then install that package update to the local set of installed packages 112. In 524, the one or more package servers 162 can update the aggregate package cache 148, as appropriate, for instance, to store or reference a newly served package update file 150, and/or to store or reference a newly generated encoded identifier 166. In 526, as understood by persons skilled in the art, processing can return to a prior processing point, jump to a further processing point, or end.

The foregoing description is illustrative, and variations in configuration and implementation may occur to persons skilled in the art. For example, while embodiments have been described in which a unitary package manager 110 locally installed one each machine in one or more clients 102 is configured to control package update activity including the reporting of an inventory of the set of installed packages 154, in embodiments, multiple applications or software can interact to control the downloading, installation, testing, reporting, and other management of software packages. For further example, while embodiments have been described in which package update activity is conducted on one client or host of a set of one or more clients 102, in embodiments, multiple local or remote targets, hosts, clients, and/or other machines can register to package manager 110 and/or other logic or resources to receive or perform package inventory, update, and/or management activity. Still further, while embodiments have been described in which the one or more package servers 162 maintain a single or unitary aggregate package cache 148, in aspects, multiple memory or storage facilities installed in, attached to, and/or associated with the one or more package servers 162 can host, store, and retrieve data related to the collective inventories of the set of installed packages 154 for the one or more clients in the managed network 100. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
receiving an inventory of installed packages of a plurality of host machines;
generating an aggregate inventory of installed packages on the plurality of host machines;
encoding an identifier for each package in the aggregate inventory of installed packages, wherein the aggregate inventory comprises the identifier for each package in the aggregate inventory;
storing, by a remote package platform, the aggregate inventory of installed packages in an aggregate package cache associated with a remote package platform; and
accessing, by a remote package platform, the aggregate package cache in response to a package update request.

2. The method of claim 1, wherein the encoded identifiers comprise identifiers produced by applying a hash function to a set of attributes of the aggregate inventory.

3. The method of claim 2, wherein the set of attributes comprises at least one of a package name identifier, a package version identifier, a package epoch identifier, a package timestamp identifier, a package size identifier, a file name identifier, a file version identifier, a file timestamp identifier, or a file size identifier.

4. The method of claim 1, wherein the aggregate inventory comprises at least one of an inventory of a set of installed packages or an inventory of a set of component files associated with the installed packages.

5. The method of claim 1, further comprising initiating a package update to one of the plurality of host machines.

6. The method of claim 5, further comprising generating an update to the aggregate package cache after the package update is installed in a host machine.

7. The method of claim 5, wherein the initiating a package update comprises initiating a package update to the plurality of host machines via the aggregate package cache on a collective basis.

8. The method of claim 1, wherein the plurality of host machines comprise a set of virtual machines.

9. The method of claim 8, wherein the set of virtual machines is hosted in a cloud-based network.

10. The method of claim 1, wherein the plurality of host machines comprise a set of hardware-based machines.

11. The method of claim 1, wherein the remote package platform comprises at least one of a package server or a package repository.

12. The method of claim 1, further comprising storing at least one package update in the aggregate package cache in association with at least one of the encoded identifiers.

13. The method of claim 1, further comprising storing a plurality of package updates in the aggregate package cache in association with a plurality of encoded identifiers.

14. The method of claim 1, wherein the accessing, by the remote package platform, the aggregate package cache comprises responding to the package update request using an encoded identifier.

15. The method of claim 14, further comprising generating an update to the aggregate package cache after the package update is installed in a host machine and wherein the update to the aggregate package cache comprises an update to the encoded identifiers stored in the aggregate package cache based on attributes of the package update.

16. A package management system, comprising:
a network interface to a plurality of host machines;
an aggregate package cache; and
a processor, communicating with the plurality of host machines via the network interface and with an aggregate package cache, the processor to
receive an inventory of installed packages of each host machine in a managed network;
generate an aggregate inventory of installed packages on the plurality of host machines the managed network;
encode an identifier for each package in the aggregate inventory of installed packages;
store the aggregate inventory of installed packages to the aggregate package cache; and
access the aggregate package cache in response to a package update request.

17. The system of claim 16, wherein the processor to initiate a package update to a host machine.

18. The system of claim 16, wherein the processor to store at least one package update in the aggregate package cache in association with the encoded identifier.

19. The system of claim 17, wherein the package management system further comprises a package repository, wherein the package update is stored in the package repository.

20. The system of claim 19, wherein the processor is in a package server and the package update is stored in the package repository.

* * * * *